US012767387B2

(12) United States Patent
Gil et al.

(10) Patent No.: US 12,767,387 B2
(45) **Date of Patent: *Oct. 20, 2026**

(54) CONTAINER TO FACILITATE SELECTIVE DELIVERY OF PARCELS

(71) Applicant: United Parcel Service Of America, Inc., Atlanta, GA (US)

(72) Inventors: Julio Gil, Atlanta, GA (US); Julian Bell, Decatur, GA (US); Fredric Michael Lopez, Atlanta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/084,001

(22) Filed: Mar. 19, 2025

(65) Prior Publication Data

US 2025/0214749 A1 Jul. 3, 2025

Related U.S. Application Data

(63) Continuation of application No. 17/690,871, filed on Mar. 9, 2022, now Pat. No. 12,280,913.
(Continued)

(51) Int. Cl.
*B65D 25/06* (2006.01)
*A47G 29/14* (2006.01)
(Continued)

(52) U.S. Cl.
CPC ............. *B65D 25/06* (2013.01); *A47G 29/14* (2013.01); *A47G 29/22* (2013.01);
(Continued)

(58) Field of Classification Search
CPC ........ B65D 25/06; A47G 29/14; A47G 29/22; A47G 29/141; A47G 29/20;
(Continued)

(56) References Cited

U.S. PATENT DOCUMENTS 4,779,752 A * 10/1988 Vallee .................... B65D 25/06 296/39.2
7,182,246 B1 2/2007 Sievel
(Continued)

FOREIGN PATENT DOCUMENTS

JP 2019-135067 A 8/2019

*Primary Examiner* — William L Miller
(74) *Attorney, Agent, or Firm* — Shook, Hardy & Bacon L.L.P.

(57) ABSTRACT

An intelligent container system is provided that accommodates a variety of sizes and shapes of parcels, and that allows the parcels to be dispensed from the container one at a time, in any order. The container system has an open face, such as the bottom. A first panel cooperates with a second panel to selectively close the open bottom, and to selectively open the bottom below a desired parcel, allowing the parcel to be individually dispensed when desired. The container system has a plurality of dividers that can be moved along the length of the container to create a series of compartments that match the sizes of the parcels within the compartments. A position sensing system is used to determine the location of the dividers, and thus the location of the compartments.

18 Claims, 14 Drawing Sheets

Related U.S. Application Data

(60) Provisional application No. 63/167,310, filed on Mar. 29, 2021.

(51) Int. Cl.
*A47G 29/22* (2006.01)
*B64U 10/16* (2023.01)
*B64U 101/64* (2023.01)

(52) U.S. Cl.
CPC .. *A47G 2029/145* (2013.01); *A47G 2029/149* (2013.01); *B64U 10/16* (2023.01); *B64U 2101/64* (2023.01)

(58) Field of Classification Search
CPC ........ A47G 2029/145; A47G 2029/149; B64U 10/16; B64U 2101/64; B64U 2101/66; B64U 9/00; B64U 1/08; G06Q 10/083; G06Q 10/0836; B64D 1/02; B64C 39/024; B64F 1/32
See application file for complete search history.

(56) References Cited

U.S. PATENT DOCUMENTS

| | | | | |
|---|---|---|---|---|
| 7,913,898 | B2 | 3/2011 | Frankenberg et al. | |
| 9,211,025 | B1 | 12/2015 | Elhawwashy | |
| 9,833,097 | B2 | 12/2017 | Byers et al. | |
| 10,538,190 | B1 | 1/2020 | Metellus et al. | |
| 10,624,484 | B1 | 4/2020 | Mountford et al. | |
| 11,506,445 | B2 | 11/2022 | Lubben et al. | |
| 12,016,479 | B1 | 6/2024 | Preston | |
| 12,319,505 | B2 * | 6/2025 | Bianco | B65G 1/137 |
| 12,324,534 | B2 * | 6/2025 | Musaed | G06Q 10/0836 |
| 12,473,149 | B1 * | 11/2025 | Brady | B60P 3/007 |
| 12,515,855 | B2 * | 1/2026 | Chernykh | B65D 51/18 |
| 12,543,880 | B2 * | 2/2026 | Tatsumoto | A47G 29/141 |
| 12,611,977 | B2 * | 4/2026 | Cieszkowski, III | B60P 3/007 |
| 12,637,289 | B2 * | 5/2026 | Gil | B65G 1/12 |
| 2013/0264381 | A1 | 10/2013 | Kim et al. | |
| 2016/0066732 | A1 | 3/2016 | Sarvestani | |
| 2019/0313826 | A1 | 10/2019 | Bickford et al. | |
| 2019/0343317 | A1 | 11/2019 | Cantrell et al. | |
| 2019/0368259 | A1 | 12/2019 | Wei et al. | |
| 2020/0074404 | A1 | 3/2020 | Gil, Jr. et al. | |
| 2020/0107664 | A1 | 4/2020 | Yang et al. | |
| 2020/0130893 | A1 | 4/2020 | Lauri | |
| 2020/0163480 | A1 | 5/2020 | Waisanen et al. | |
| 2020/0172337 | A1 | 6/2020 | Wilkinson et al. | |
| 2021/0007523 | A1 | 1/2021 | Baek | |
| 2022/0402654 | A1 * | 12/2022 | Andrade | B65D 25/06 |
| 2023/0044060 | A1 | 2/2023 | Carr | |
| 2023/0165395 | A1 | 6/2023 | Ieradi | |
| 2023/0363562 | A1 | 11/2023 | Otoole et al. | |
| 2024/0002115 | A1 | 1/2024 | Chernykh | |
| 2024/0053084 | A1 | 2/2024 | Wang et al. | |
| 2024/0268590 | A1 | 8/2024 | Musaed | |
| 2025/0148857 | A1 * | 5/2025 | Ecton | A47G 29/141 |

* cited by examiner

CONTAINER TO FACILITATE SELECTIVE DELIVERY OF PARCELS

CROSS-REFERENCE TO RELATED APPLICATIONS

The present application claims the benefit of U.S. Provisional Application No. 63/167,310, entitled "A Container to Facilitate Selective Delivery of Parcels," filed Mar. 29, 2021, and to U.S. application Ser. No. 17/690,871, filed Mar. 9, 2022, entitled "A Container to Facilitate Selective Delivery of Parcels," both of which are expressly incorporated by reference in their entireties.

BACKGROUND

Delivery of parcels requires the temporary storage of parcels, such as when the parcels are loaded for delivery. At the delivery site, the correct parcel must be selected and retrieved for delivery. This often involves human labor, care and effort in finding, selecting, and retrieving the parcel for delivery. Delivery companies look to increase delivery efficiency and to decrease the physical demands on human couriers.

SUMMARY

At a high level, aspects described herein relate to a container to facilitate selective delivery of parcels. As parcels are placed in the container, a divider of the container sweeps the parcel into place, next to the last parcel placed into the container. A position sensing system determines and records in memory the location of the divider. The system records the positions of the dividers, and associates the position of a respective parcel between the dividers on either side of the parcel. The container has at least one open face, such as the bottom of the container. The open face is covered by a first panel and a second panel. The first panel and the second panel are moved in a coordinated fashion by a first movement mechanism, such as a motor, coupled to the first panel, and a second movement mechanism, such as a motor, coupled to the second panel. In some aspects, the first motor may drive the second panel, and the second motor may drive the first panel. Through coordinated movement of the first panel and the second panel, the open area below a selected parcel can be exposed, allowing the parcel to exit the container, such as by gravity, manual selection by an operator, or by the action of a mechanical system associated with the container. In this way, a parcel associated with a delivery address can be accurately selected for delivery in any order desired.

The container may be used in any number of delivery environments, such as unmanned vehicle delivery systems, such as drones or robots, or as a component of a delivery vehicle, or any combination of these aspects.

This summary is intended to introduce a selection of concepts in a simplified form that are further described below in the detailed description section of this disclosure. This summary is not intended to identify key or essential features of the claimed subject matter, nor is it intended to be used as an aid in determining the scope of the claimed subject matter.

Additional objects, advantages, and novel features of the technology will be set forth in part in the description that follows, and in part will become apparent to those skilled in the art upon examination of the following or learned by practice of the technology.

BRIEF DESCRIPTION OF THE DRAWINGS

The present technology is described in detail below with reference to the attached drawing figures, wherein.

DETAILED DESCRIPTION

The present disclosure provides for an intelligent container system usable to store and deliver a variable number of parcels, of varying size, and allows for delivery of the stored parcels in any order. The container system does not require a first in, first out, or last in first out delivery order. In some aspects, the container is usable in an unmanned system, such as an unmanned aerial vehicle (UAV) delivery platform (such as a drone), other robotic delivery platforms, as a tote storage and retrieval system, and/or as a component of a delivery vehicle or locker system, or any combination of these.

Throughout this disclosure, "unmanned systems" include systems that are capable of operating for at least a period of time without input from an on-board human. Unmanned systems may include terrestrial, aquatic, or aerial vehicles. An unmanned system may sometimes include a human on board who is capable of taking control of the unmanned system or that provides instructions to the unmanned system. Some unmanned systems may operate without a human on board, but may be controlled or partially controlled remotely by a human pilot. Some unmanned systems may operate autonomously by receiving instructions from a computer program. Thus, to complete an objective, an unmanned system may operate autonomously, under the guidance of received instructions, or under partial or total control of a human pilot. The words "drone" and/or "robot" are synonymous with "unmanned system" as used herein.

Having described a high level summary of the technology, example aspects are provided below in further detail with reference to the figures.

Figure 1:
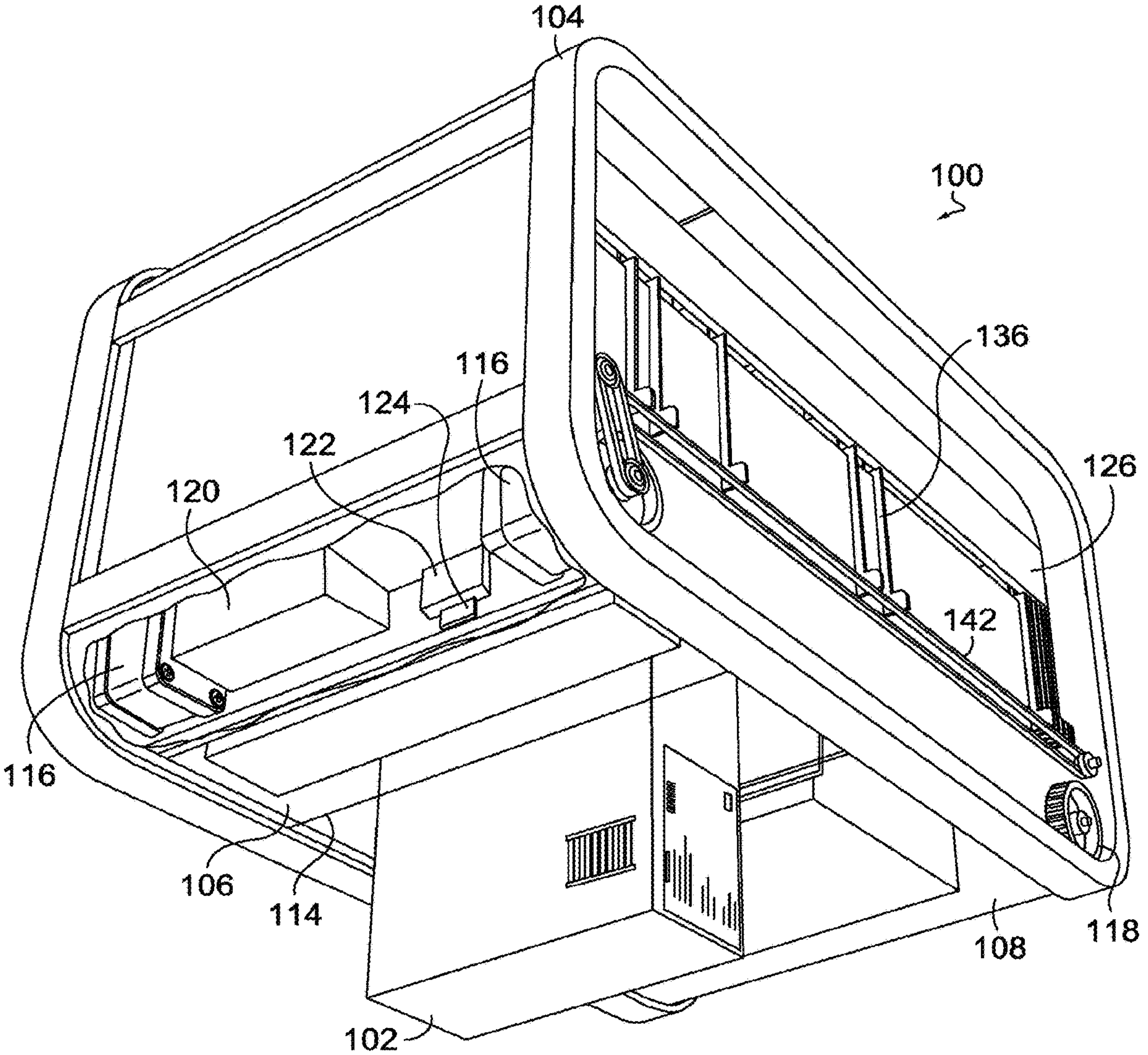
FIG. 1 is a perspective view of a container, with portions broken away and others shown as transparent, to show details of construction, in accordance with aspects described herein.
Figure 2:
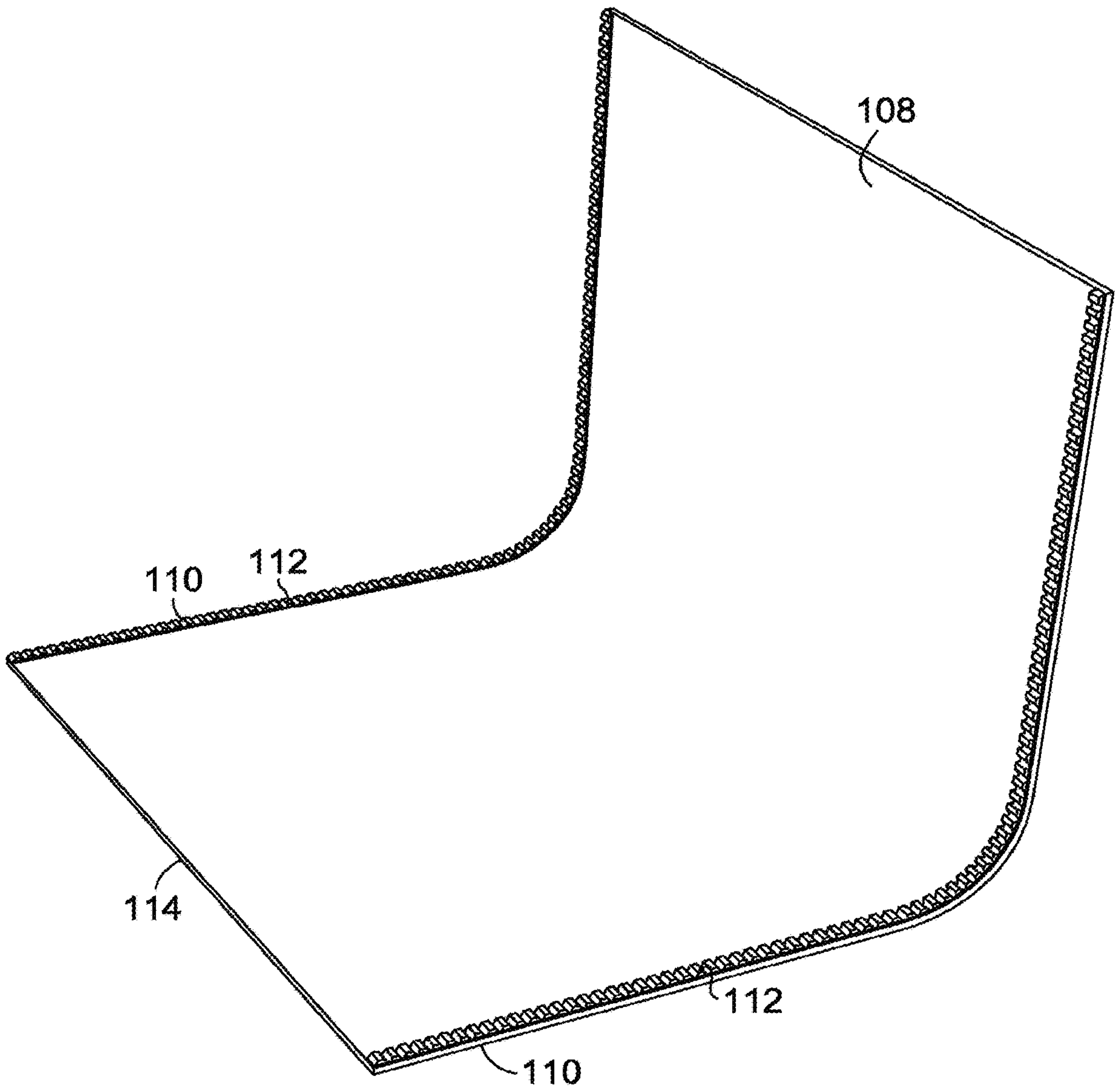
FIG. 2 is a perspective view of a panel, used on the container in accordance with aspects described herein.
Figure 3:
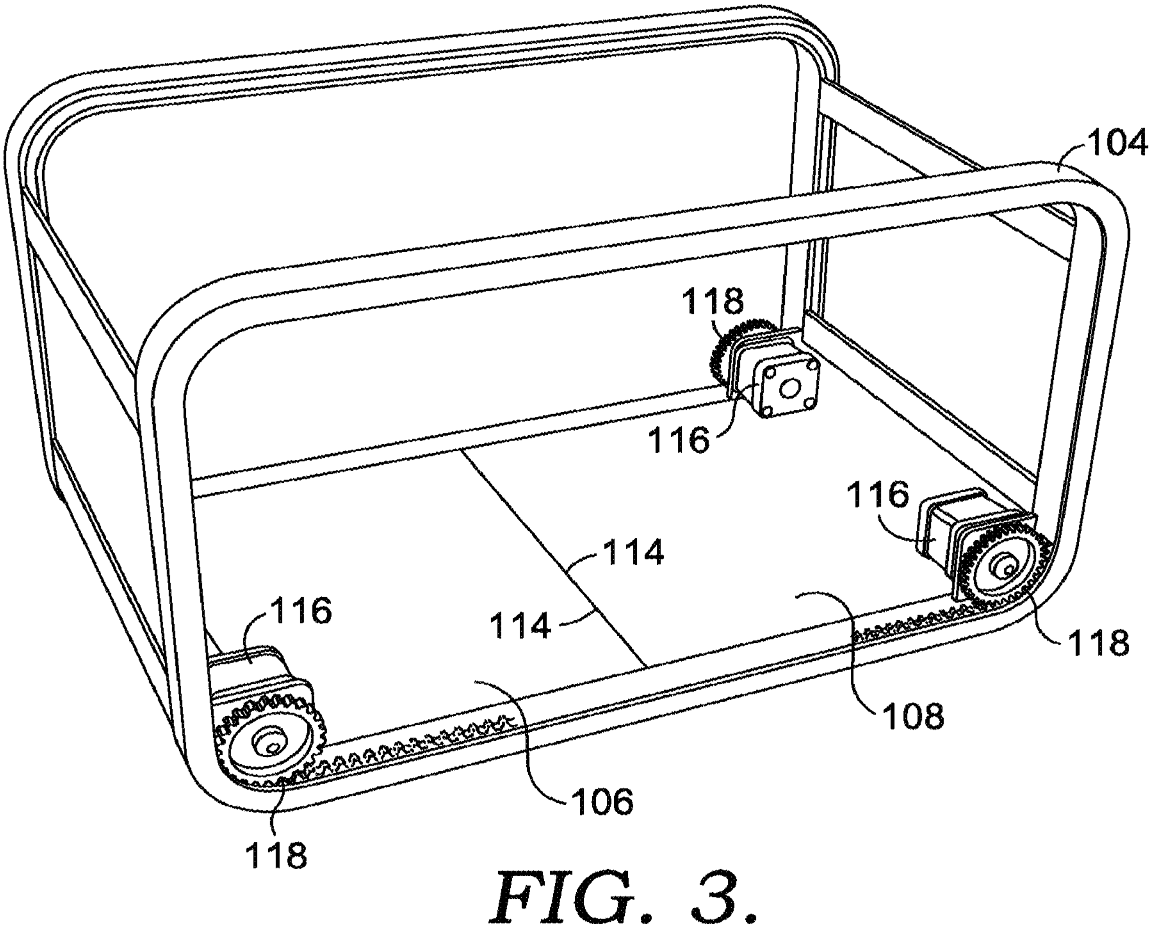
FIG. 3 is a perspective view of selected portions of the container, in accordance with aspects described herein.

FIG. 1 provides a perspective view of a container 100 that may be used to store and deliver parcels (the parcels being labeled in the figures as 102). As best seen in FIG. 3, in some aspects, the container 100 has a rigid frame 104. The frame 104 is constructed from a sturdy, lightweight material. In some aspects, the frame 104 has at least one open face, and in some aspects, the container 100 is oriented such that the open face is the bottom, allowing for gravity-assisted delivery of the parcel 102. The frame 104 supports a first panel 106 and a second panel 108. In FIG. 1, portions of the first panel 106 are broken away, and portions of the first panel 106 and the second panel 108 are shown as transparent to reveal other components. In some aspects, the first panel 106 and the second panel 108 are mirror-images of one another. The second panel 108 is shown in isolation in FIG. 2. In some aspects, the first panel 106 and the second panel 108 are constructed of a flexible, but strong plastic sheeting material. In other aspects, a plastic tambour sliding panel may be used for the first panel 106 and the second panel 108. Other materials, including non-plastic materials, could also be used for the first panel 106 and the second panel 108. The following discussion of the second panel 108 applies equally to the first panel 106, but will not be repeated for the sake of brevity. As shown in FIG. 2, the second panel 108 is flexible, allowing it to bend. In some aspects, the second panel 108 includes outer edges 110 that include a series of teeth, constructed as a gear rack 112. In other aspects, the outer edges 110 include a series of holes (socket holes), to interact with a gear as further described below. In this aspect, the socket holes may be reinforced (such as with thin strips of spring steel, as an example) to increase the ability of the first panel 106 and/or the second panel 108 to transmit compressive loads. As best seen in FIG. 2, the second panel 108 has a terminal end 114. In a first position, the first panel 106 and the second panel 108 may be positioned to completely cover the open bottom face of the frame 104, as shown in FIG. 3. In this first position, the terminal end 114 of the first panel 106 abuts the terminal end 114 of the second panel 108. In some aspects, the terminal end 114 of the first panel 106 mates with the terminal end 114 of the second panel 108. In this aspect, one terminal end 114 on one of first panel 106 or second panel 108 may have a male protrusion that mates with a terminal end 114 of the opposite panel having a mating female shape. In some aspects, the first panel 106 and the second panel 108 have a length that is equal to or greater than the length of the open bottom face of the frame 104, such that either the first panel 106 or the second panel 108 could substantially cover the entire open face of the frame 104. The first panel 106 and the second panel 108 are slidingly coupled to the frame 104, and in some aspects, the frame 104 may have a track therein that accepts the first panel 106 and the second panel 108. In other aspects, the first panel 106 and/or the second panel 108 may be rolled into a cylinder and housed within a cylindrical enclosure at either end of the frame 104. In some aspects, the terminal end 114 of the first panel 106 may be coupled to the opposite end of the first panel 106, and/or the terminal end 114 of the second panel 108 may be coupled to the opposite end of second panel 108, such as with a tensioned cable, string, belt or other tensile member. In this aspect, the first panel 106 and the second panel 108 form a continuous closed loop around the outside perimeter of the container 100, and are driven like a normal tensile belt, rather than requiring the first panel 106 and the second panel 108 to withstand compressive forces as the first panel 106 and the second panel 108 are driven.

As shown in FIG. 3, in some aspects, a pair of motors 116 are coupled to each end of the frame 104 and have a gear 118 that mates with the rack 112 in the first panel 106 or the second panel 108. While two motors 116 are shown on each end of the frame 104, it is contemplated that only one motor 116 may be utilized on each end of the frame 104 (in some aspects this could be accomplished with a connecting shaft to join gears 118 on opposite sides of the frame 104). As the motor 116 rotates the gear 118, the first panel 106 or the second panel 108 are moved relative to the frame 104, following the contour of the frame 104. In some aspects, as further described below, the motors 116 cooperatively move the first panel 106 and the second panel 108 to expose a desired area below only the parcel 102 that is desired to be delivered or dispensed. In some aspects, the container 100 may also include a mechanism to assist the parcel 102 as it exits the container 100, beyond gravity. In some aspects, this mechanism may operate to exert a pushing force on the parcel 102, such as, for example, a belt, or segmented belt, a linear actuator, or a pneumatic device. While other motors may be used, in some aspects, motors 116 are stepper motors. While the motors 116 are shown as internal to the frame 104, in other aspects, the motors 116 and the gears 118 may be external to the frame 104. In some aspects, a drive motor (such as motor 116) may not engage the first panel 106 and/or the second panel 108 directly. In this aspect, the drive motor may drive a tensile member that couples the ends of the first panel 106 together, and/or the ends of the second panel 108 together.

As best seen in FIG. 1, the motors 116 may be powered by a battery 120 coupled to the frame 104. The battery 120 may be any of a number of batteries, and in some aspects is a rechargeable battery. The battery 120 may also be external to the container 100 itself that may have an electrical connector for a power supply. With continued reference to FIG. 1, the container 100 may also have an on-board central processing unit (CPU) and a memory card 124 to store information and carry out the logic associated with the container 100. The container 100 may also have wireless or wired communications to transmit and receive content, divider information (such as divider 136 described below) and actions to perform. In general, the memory 124 stores computer-usable information, such as data or instructions. One example of memory 124 is described in FIG. 16 with reference to memory 612. While memory 124 is depicted as a single data store, memory 124 may include one or more data stores or may be in a cloud environment.

Figure 4:
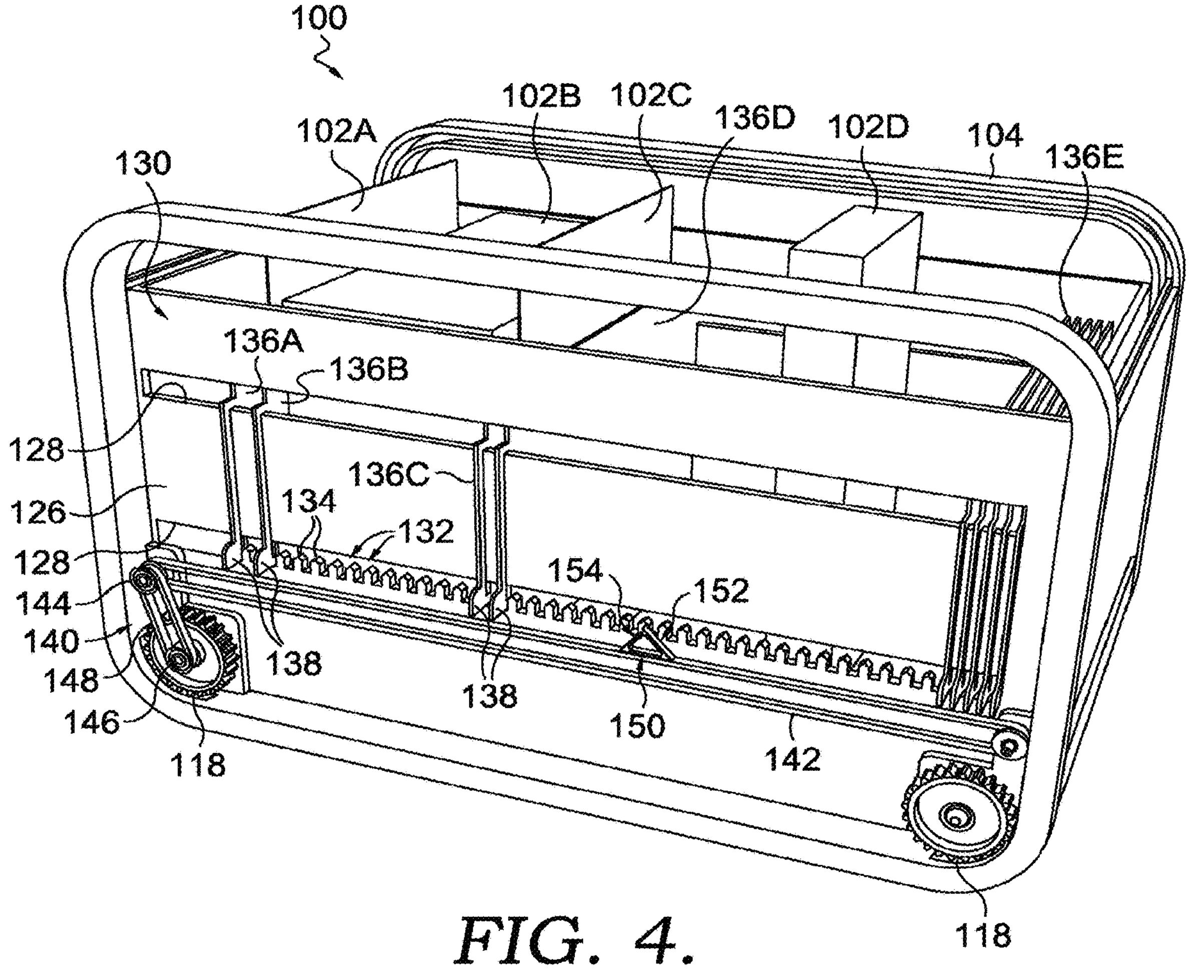
FIG. 4 is a perspective view of the container of FIG. 1, in accordance with aspects described herein.

As best seen in FIG. 4, the container 100 may have sides 126 having spaced lateral grooves 128 therealong. In some aspects, each side 126 has an upper groove 128 and a lower groove 128 below the upper groove. In some aspects, the sides 126 are part of a removable tote 130 that fits within the frame 104 of the container 100. The sides 126 may also have a series of slots 132 formed by spaced protrusions 134. In some aspects, the slots 132 are formed in the lower groove 128.

With continued reference to FIG. 4, the container 100 has a series of dividers 136 that are supported by, and slide along, the upper and lower grooves 128. The dividers 136 are positioned along the sides 126 to create compartments of varying sizes based upon the parcels 102 contained therein.

As an example, parcel 102A in FIG. 4 may be thin, such as an envelope. A first divider 136A is spaced a short distance from an adjacent divider 136B to create a narrow compartment in the container 100 that approximates the size of the parcel 102A. In a similar fashion, a larger parcel 102B may be accommodated and located between the divider 136B and a divider 136C. Once in a desired location along the sides 126, the dividers 136, in some aspects, are held in the desired location by a tab 138 on the divider 136 that drops into a corresponding slot 132 at the desired location. As shown in FIG. 4, the container 100 may store any dividers 136 that are not used in creating compartments at one end of the container 100.

With initial reference to FIG. 4, the container 100 may also have a divider movement mechanism 140. In some aspects, the divider movement mechanism has a drive belt 142 that extends along the length of at least one side 126. In some aspects, the drive belt 142 is driven by a pulley or gear 144 that is, in turn, driven by one of the motors 116. In some aspects, a common shaft of the motor 116 selectively drives either the gear 118, or a gear 146. When driven by the motor 116, the gear 146 is coupled through a chain or belt 148 to gear 144. In some aspects, the selective drive of either gear 118 or gear 146 utilizes a concentric axle that is driven by motor 116. In other aspects, a separate motor may be used to move drive belt 142. In still other aspects, a solenoid clutch may be used to selectively drive either gear 118 or gear 146.

Figure 5:
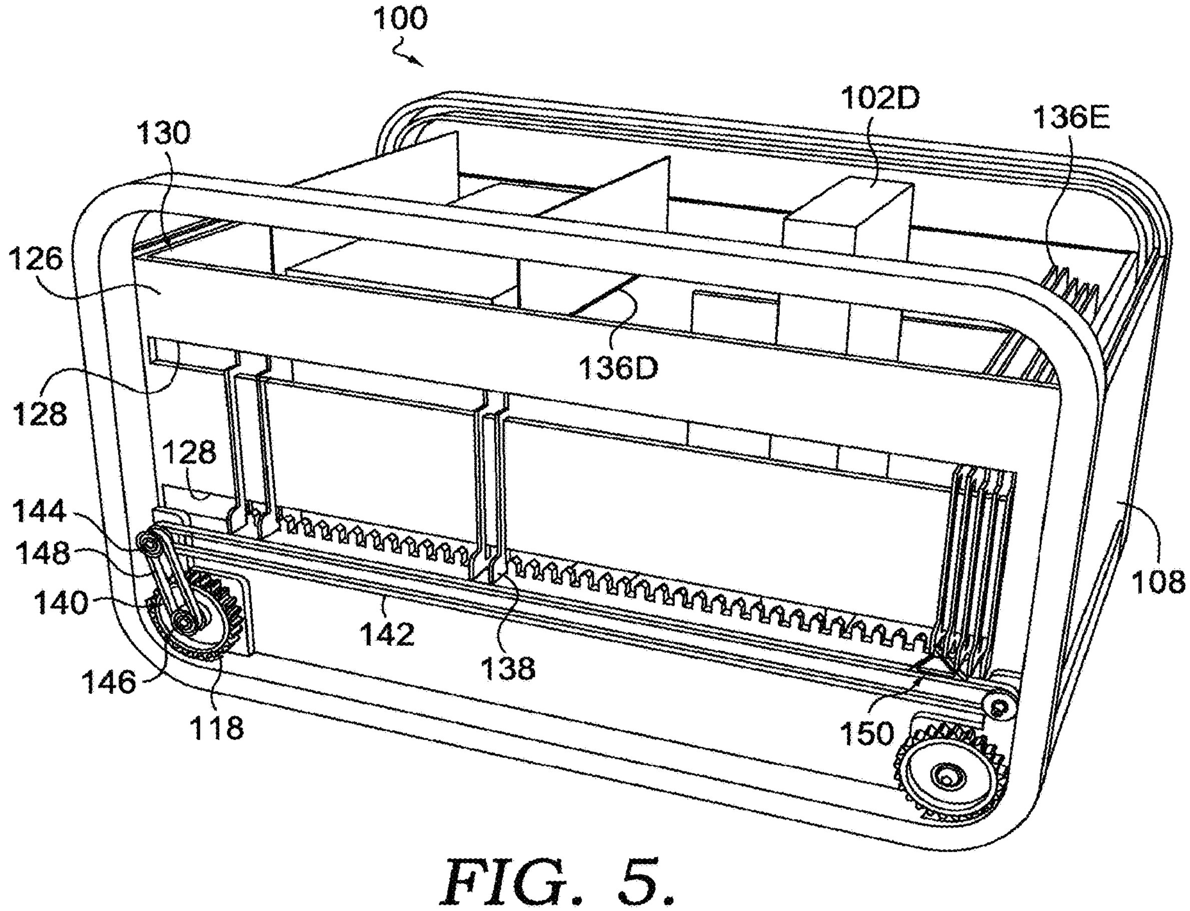
FIG. 5 is a view similar to FIG. 4, showing aspects of a divider movement mechanism of the container, in accordance with aspects described herein.
Figure 6:
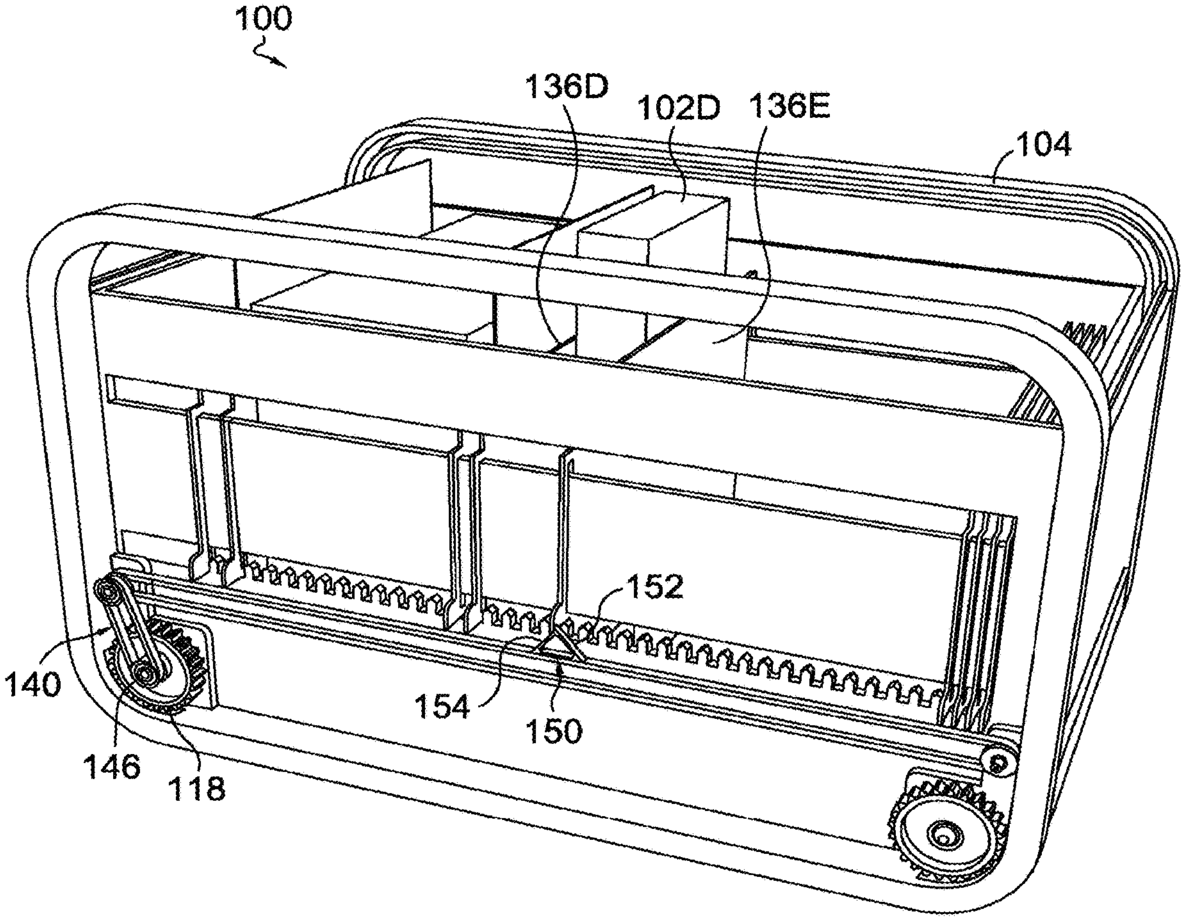
FIG. 6 is a view similar to FIG. 5, showing a different stage of the divider movement mechanism.

In some aspects, a divider engagement device 150 is coupled to the drive belt 142 and protrudes upwardly therefrom. The divider engagement device 150, in some aspects, has a triangular shape including a first surface 152 that operates as a cam surface to select the next available divider 136 from the stored dividers 136 at one end of the container 100. In FIG. 4, the next available divider 136 is labeled 136E. As can be seen by comparing FIG. 4 to FIG. 5, the divider engagement device 150 is moved, as belt 142 moves, such that the first surface 152 engages the tab 138 on divider 136E. As the tab 138 contacts the first surface 152, the divider 136E is lifted above the protrusions 134, allowing the divider 136E to move freely along the side 126 of the container 100. In some aspects, the divider engagement device 150 has a catch surface 154 (the leg of the triangle adjacent first surface 152 in this aspect). The catch surface 154 contacts the tab 138 on the divider 136E. At this point, the direction of the drive belt 142 can be reversed, and the divider engagement device 150 moves the divider 136E away from the end of the container 100. As described further below, the divider 136E is moved against a parcel (labeled 102D in FIGS. 5 and 6) that has been placed within the container 100. As the divider 136E moves further, the parcel 102D moves as well, until the parcel 102D contacts the divider labeled 136D, effectively "sandwiching" the parcel 102D between divider 136D and divider 136E.

Figure 7:
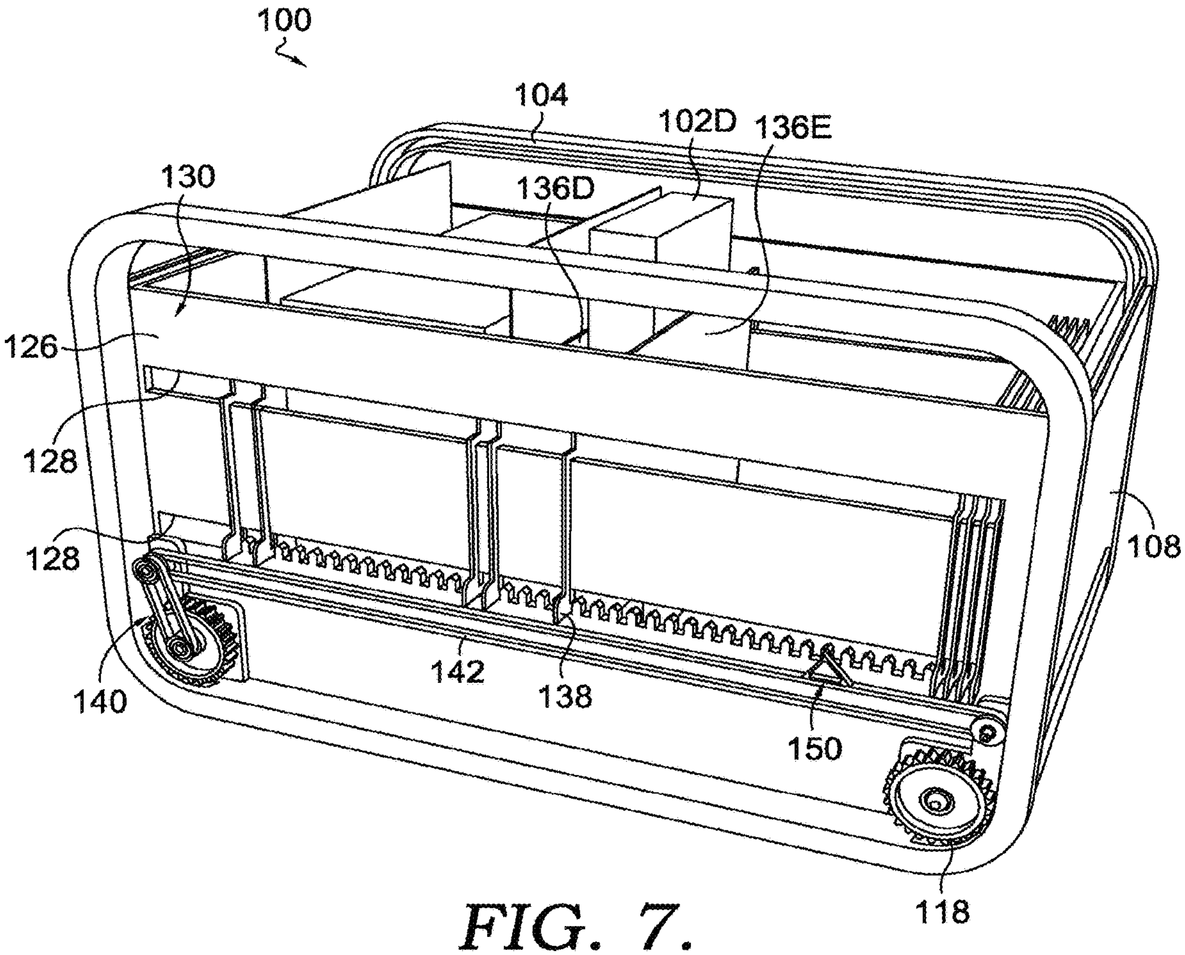
FIG. 7 is a view similar to FIG. 6, showing yet another stage of the divider movement mechanism, in accordance with embodiments described herein.
Figure 11:
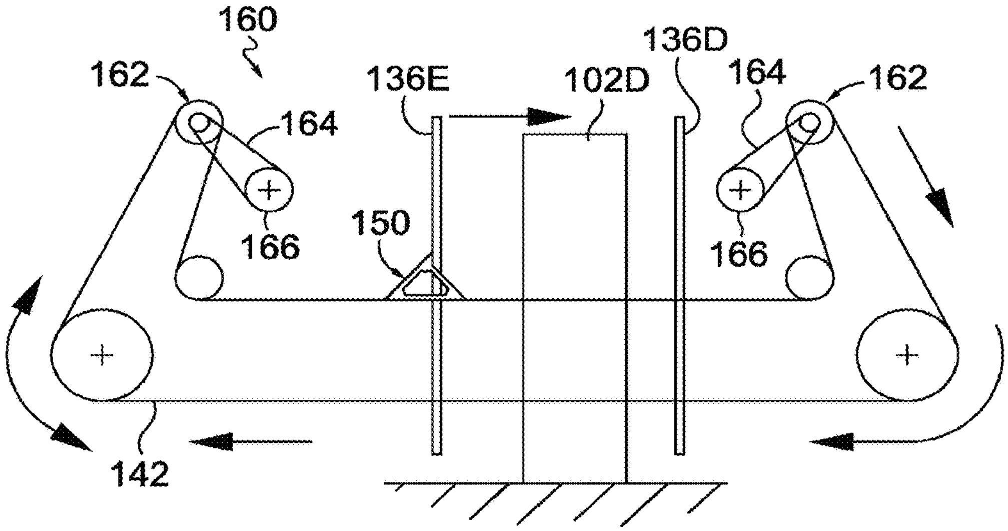
FIG. 11 illustrates a divider position sensing system with a representative divider in a first position, in accordance with embodiments described herein.
Figure 12:
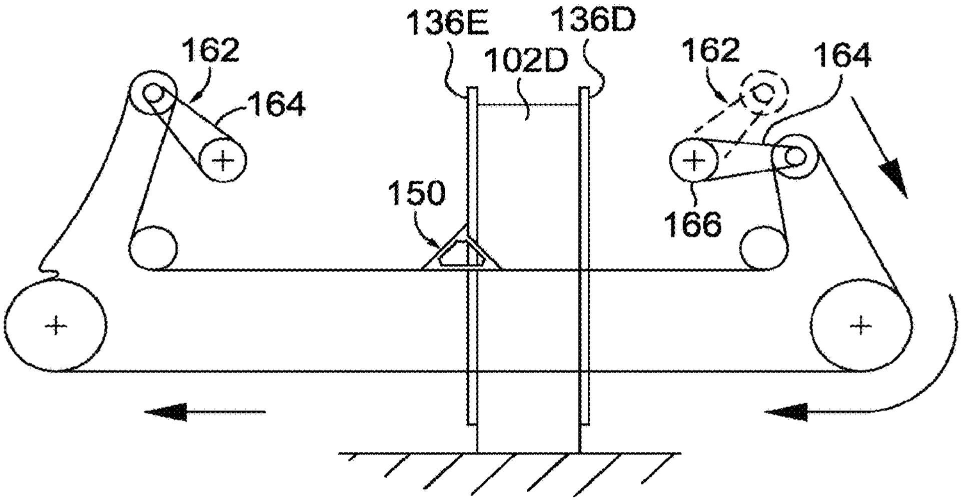
FIG. 12 is a view similar to FIG. 11, with the representative divider in a second position against a parcel.

In some aspects, the container 100 has a position sensing system that determines the position of the dividers 136. One aspect of a position sensing system 160 is shown, somewhat schematically, in FIGS. 11 and 12. As shown in FIG. 11 (from the side of the container 100 opposite that shown in FIGS. 1-7), in some aspects the drive belt 142 includes at least one belt tensioner 162 that has a tensioner arm 164. As shown in FIG. 11, in some aspects, two belt tensioners 162 are coupled to the drive belt 142. The tensioner arms 164 are spring-loaded to apply tension to the drive belt 142, and are mounted on rotary pivots 166. The rotary pivots 166 have an associated rotary encoder that detects and records motion in the rotary pivots 166. As tension in the drive belt 142 increases, deflections in the tension arms 164 will register in the rotary encoders. As the divider (labeled 136E) is moved by the divider engagement device 150 against the parcel 102D, a relatively small amount of force is encountered by the divider 136E, and will register as a relatively small deflection of the tension arms 164. When the parcel 102D is moved by divider 136E and the divider engagement device 150 against divider 136D, the tension in drive belt 142 will register as an increased force in the rotary encoders as the tension arm 164 deflects, as shown in FIG. 12 (note that FIG. 12 shows the left tension arm 164 in the same position for illustrative purposes to illustrate the reduced tension in the drive belt 142, and in some aspects, the left tension arm 164 will react to remove the "slack"). In this aspect, the container 100 registers the parcel 102D as fully within a compartment when the increased force discussed above with respect to FIG. 12 is encountered. When this increased force on the tension arm 164 is registered in the rotary encoder, the direction of the drive belt 142 may be again reversed, releasing the divider 136E from the divider engagement device 150 (as shown in FIG. 7). As the divider engagement device 150 moves away from the divider 136E, tension arm 164 returns to the position shown in FIG. 11, and the divider 136E lowers into a corresponding slot 132 to lock the divider 136E in place. The location of the divider 136E may be registered as that location when the rotary encoder registered the increased force on tension arm 164, and may be stored in memory 124.

Figure 13:
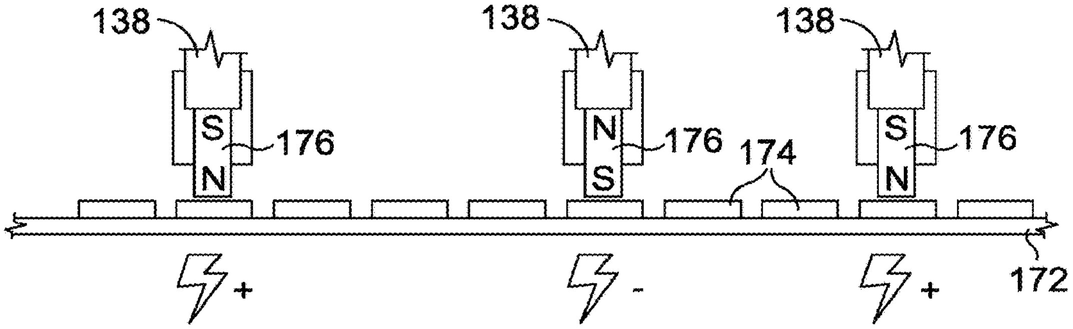
FIG. 13 schematically illustrates a portion of another divider position sensing system, in accordance with embodiments described herein.
Figure 14:
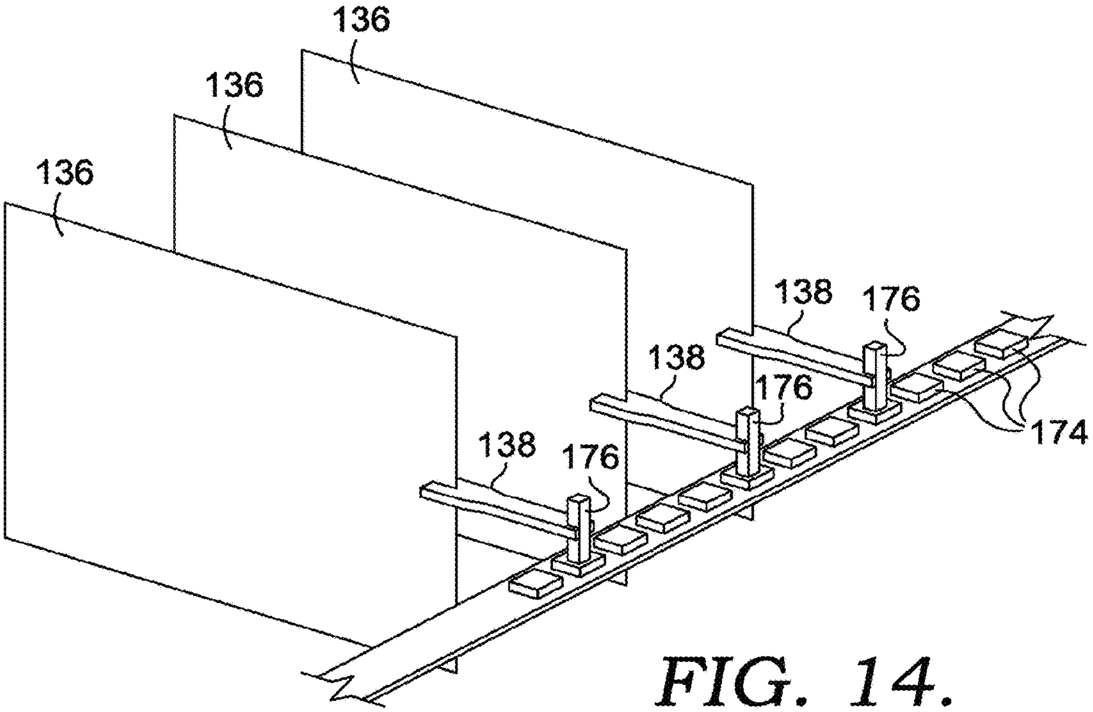
FIG. 14 illustrates the divider position sensing system of FIG. 13, in the container environment, in accordance with embodiments described herein.

In other aspects, a position sensing system 170 is shown in FIGS. 13 and 14. As shown in FIG. 13, the position sensing system 170 includes a printed circuit board (PCB) 172 used as a linear position sensor of the dividers 136. In some aspects, the PCB 172 is flexible and can follow a non-linear path. The position sensing system 170 also includes Hall effect sensors 174 arranged in a linear, multiplexed array. Each divider 136 includes a magnet 176 mounted a distance above the array of Hall effect sensors 174 (such as, for example, between 1 and 5 mm). In some aspects, the magnets 176 may be mounted to the tabs 138 on dividers 136 and are shown somewhat schematically in FIGS. 13 and 14. In some aspects, adjacent dividers 136 have magnets 176 with an opposite polarity. In this aspect, the dividers 136 are arranged with magnets 176 having alternating polarity (N, S, N, S and so on). As the divider 136 moves the magnet 176 along the array of Hall effect sensors 174, sequential Hall effect sensors 174 latch and unlatch, indicating the position of the magnet 176 along the array. Since Hall effect sensors 174 detect not only the position, but also the polarity of a magnet 176, the position sensing system 170 may be used to distinguish between dividers with N or S polarity. In some aspects, a specialized integrated circuit could be fabricated that integrates the Hall effect sensors 174 and measurement electronics in a single package, such as a rigid chip or a flexible tape. As the position sensing system 170 determines the position of a respective divider 136, the position may be stored in memory 124.

Figure 15:
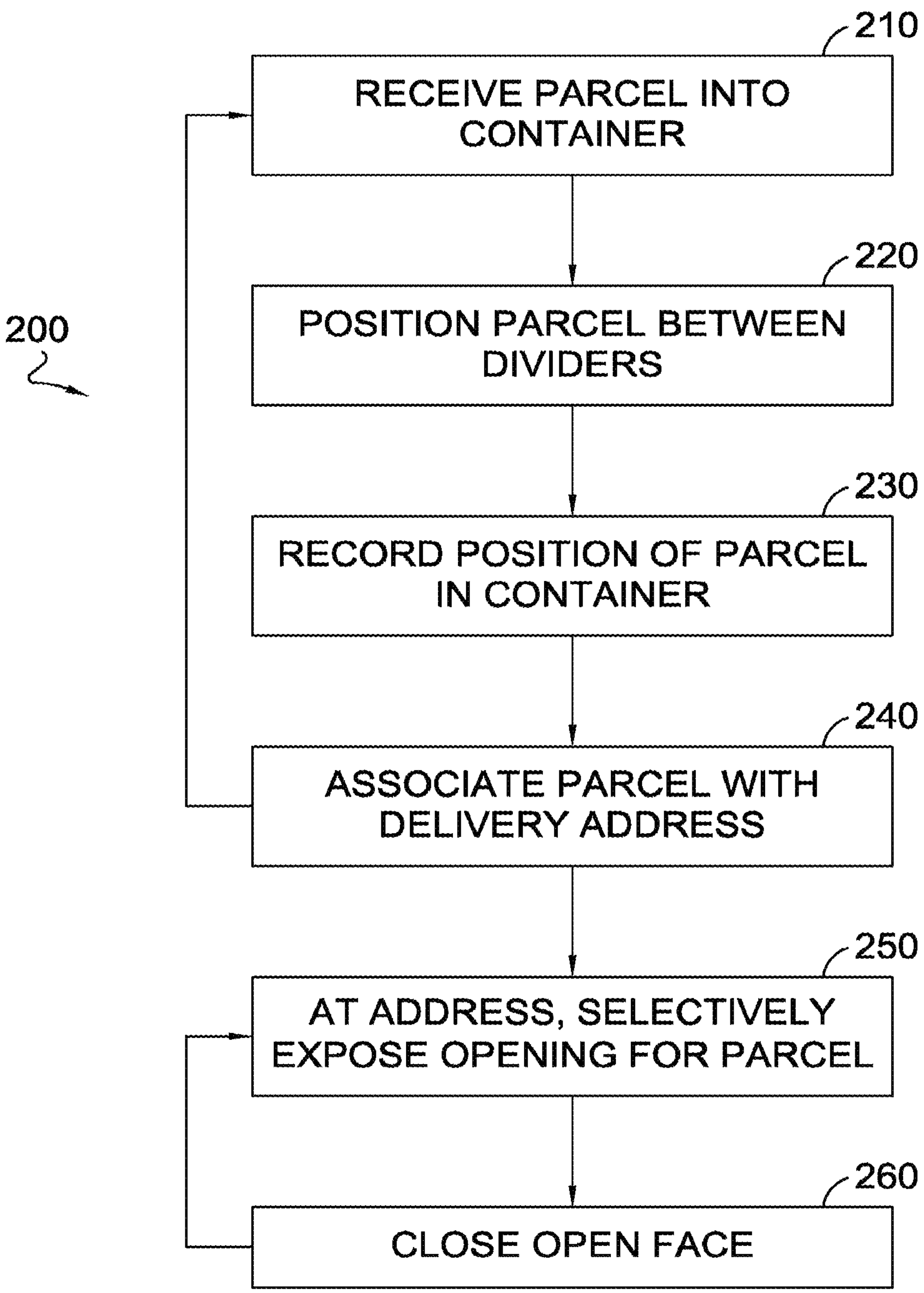
FIG. 15 illustrates an example method that may be performed using the container, in accordance with embodiments described herein.

The container 100 may be used, in some aspects, according to the method 200 shown in FIG. 15. In use, the container 100 can be used within a larger ecosystem as a "smart" container, as the container 100 communicates with the ecosystem for route planning and delivery purposes of the parcels 102 within container 100. As shown in FIG. 15, the method 200 includes receiving a parcel (such as parcel 102) within the container 100, as shown at block 210. At block 210, the parcel 102 being received within the container 100 may be identified to the container 100, such as with a barcode identifier, QR code, or other identifier. The identifier for the parcel 102 may be received by, and stored in, memory 124. The parcel 102 may be manually placed within container 100 by an operator at block 210, or the parcel 102 may be loaded within container 100 in an automated fashion. As a parcel 102 is received within the container 100, the method continues by positioning the parcel 102 between dividers 136, as shown at block 220. To position the parcel 102 between dividers 136, the parcel 102 may be placed between a divider 136 already in place, such as divider 136D in FIG. 4, and the next stored, unused divider 136 on an end of the container 100, such as divider 136E in FIG. 4. The divider movement mechanism 140 may then be signaled to move divider 136E, to sweep the parcel (such as parcel 102D in FIG. 4) such that it is sandwiched between divider 136D and divider 136E. Once in this position, the method 200 continues by recording the position of the parcel (such as parcel 102D) within the container 100, as shown at block 230. The position of the parcel 102 is determined, in some aspects, by the position sensing system (such as the position sensing system 160 or the position sensing system 170). As shown at block 240, the parcel (such as parcel 102D) is associated with a delivery address. The association of the parcel with a delivery address can be done as the parcel 102 is received within the container 100, prior to the parcel 102 being received within the container 100 or after the parcel 102 is received within the container 100. The method 200 may then loop back to block 210, until all the desired parcels 102 have been loaded into the container 100, or until the container 100 is at capacity. At the desired location, such as at or near the address associated with the parcel, the container 100 selectively exposes the area of the open face (such as the bottom) of frame 104, as shown at block 250. As best seen in FIG. 1, the first panel 106 and the second panel 108 are moved cooperatively (such as moving the terminal end 114 of first panel 106 in line with the divider 136 forming one side of the compartment associated with the desired parcel, and moving the terminal end 114 of the second panel 108 in line with the divider forming the opposite side of the compartment associate with the desired parcel.) The motors 116 selectively move the first panel 106 and the second panel 108 to the positions needed to release the parcel, informed by the position of the dividers 136 sensed by the position sensing system 160 or the position sensing system 170. As shown in FIG. 1, with the gap between the terminal end 114 of the first panel 106 and the terminal end 114 of the second panel 116, the parcel 102 is allowed to exit the container 100 through the open bottom face, such as by gravity. Once the parcel 102 is release from the container, the first panel 106 and the second panel 108 are moved by motors 116 such that the terminal end 114 of the first panel 106 abuts the terminal end 114 of the second panel 108 to effectively close the open bottom face of the frame 104, as shown at block 260. The method 200 then loops back to block 250 until all the parcels 102 have been delivered.

Figure 8:
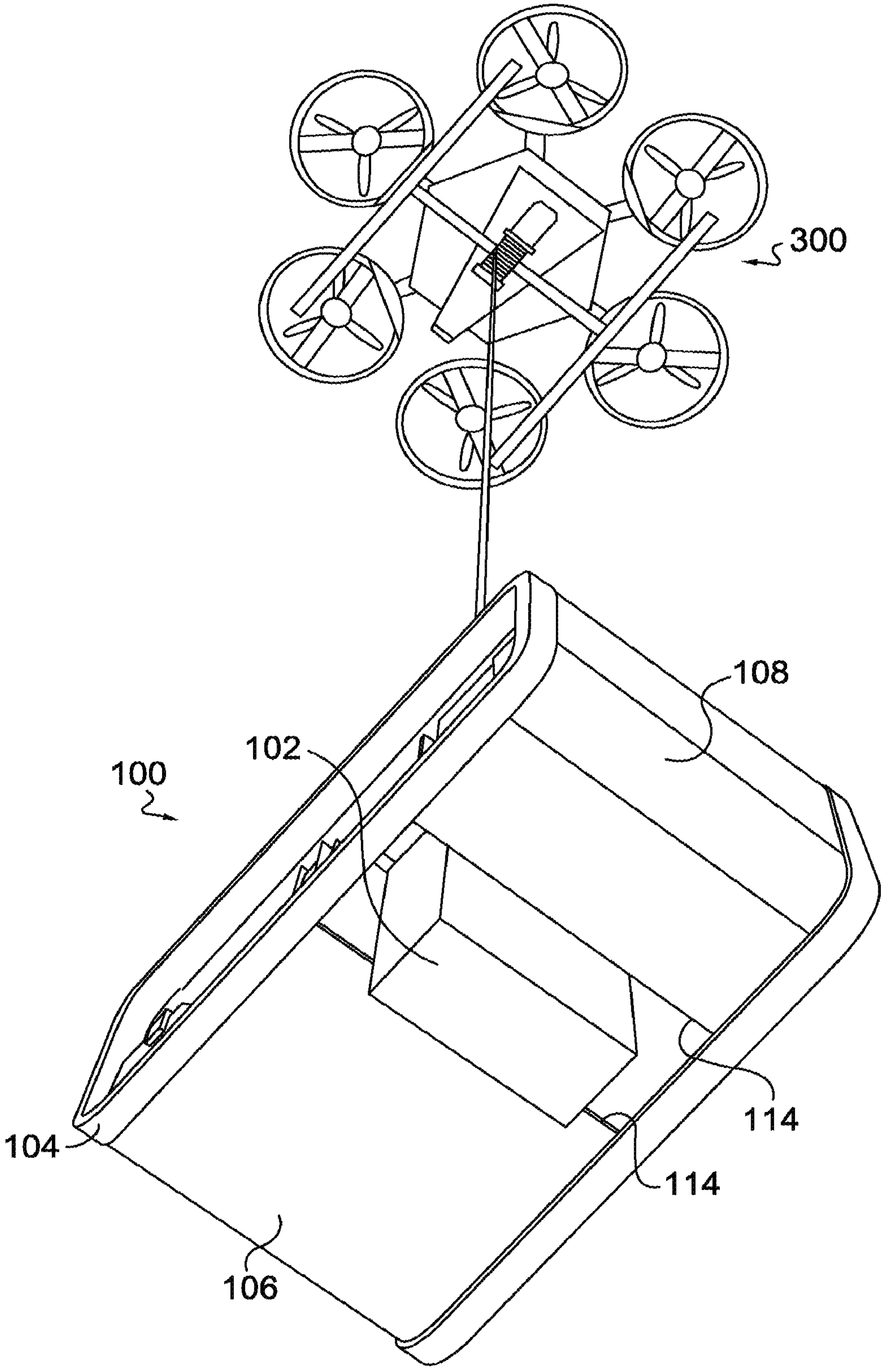
FIGS. 8-10 illustrate example aspects of the container in different use-case environments, in accordance with embodiments described herein.

The container 100 is well-suited to any number of use-case environments or scenarios. While some use-case scenarios are discussed below, the following discussion is not intended to in any way be limiting of the number or variety of use-cases for the container 100. FIG. 8 depicts a use-case scenario involving delivery of parcels 102 within container 100 by a UAV, such as a drone 300. Once loaded into the container 100, the parcels 102 may be transported by the drone 300 to a desired location. At the desired location, the desired parcel associated with the location or address is selectively released by the container 100, and the drone 300 can continue to the next location associated with a parcel 102 within the container 100. The drone 300 is not required to travel to the associated addresses or locations in any particular order, and the container 100 can store a variety of sizes of parcels 102, to be delivered in any order.

Figure 9:
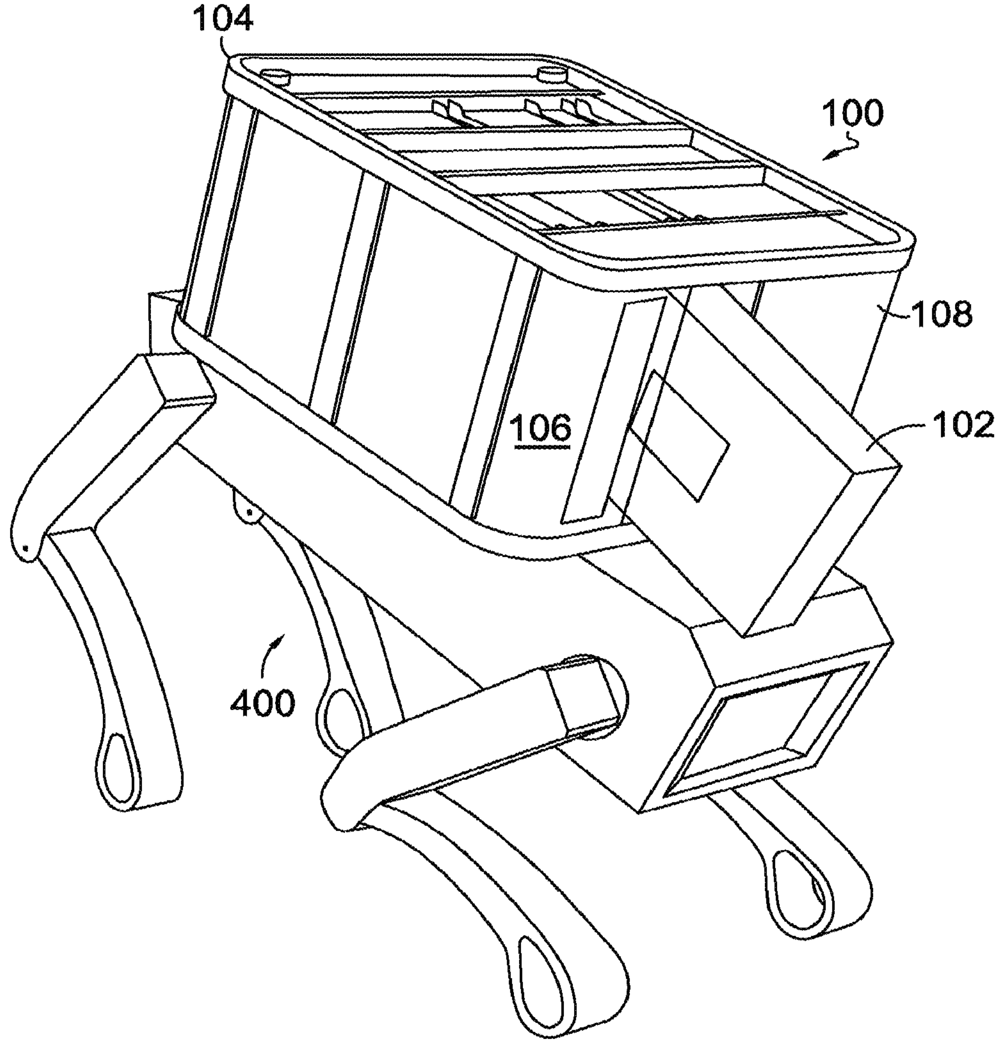

FIG. 9 depicts a use-case scenario associated with a robotic delivery mechanism 400, where parcels 102 may be released or dispensed from container 100 in any order, and only at the address or location associated with the parcel 102 to be dispensed.

Figure 10:
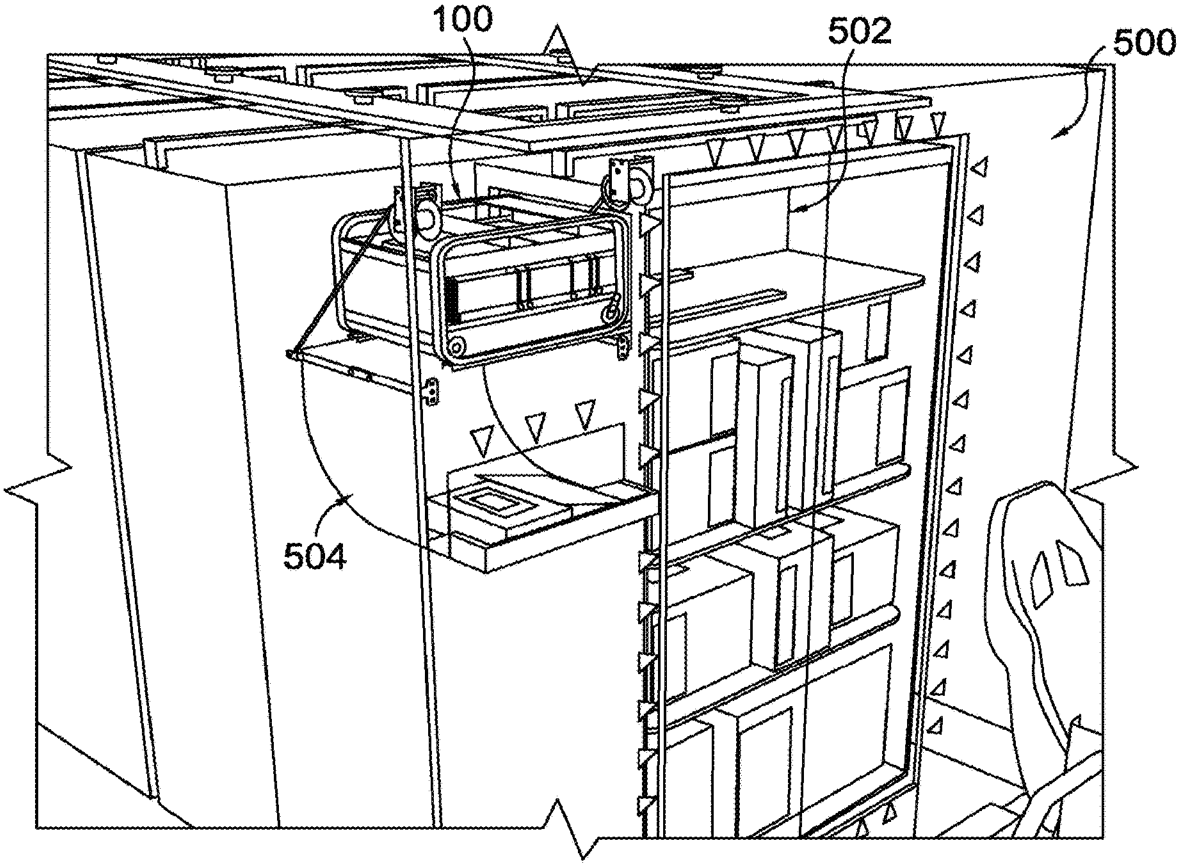

FIG. 10 depicts yet another use-case scenario with the container 100 installed as part of a delivery vehicle 500. In this scenario, the container 100 may be installed on a rack system 502, and can be moved from the rack system 502 at or near the delivery location or address. The delivery vehicle 500 may also have a slide 504 or other delivery system to move a parcel 102 released from the container 100 to a desired location for retrieval by an operator of the delivery vehicle 500.

Throughout this disclosure, several embodiments of the container 100, or components thereof, are described. Some embodiments of different use-case scenarios have also been described. It will be recognized that not all embodiments of the container, or the use-case scenarios for the container, can be described in this disclosure, and therefore, it is intended by the inventors that the various aspects and components described relative to each embodiment or use case scenario of the container are not intended to be limiting, are interchangeable and can be in any combination with any other embodiment.

With regard to various embodiments described in this disclosure, and with reference to the method above, aspects of the present technology may take the form of methods (such as method 200); systems; one or more computer storage media having computer-executable instructions embodied thereon that may be executed by one or more processors (such as CPU 122); or any combination thereof.

Referring back now to FIG. 16, an exemplary operating environment for implementing embodiments of the present invention is shown and designated generally as computing device 600. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

Figure 16:
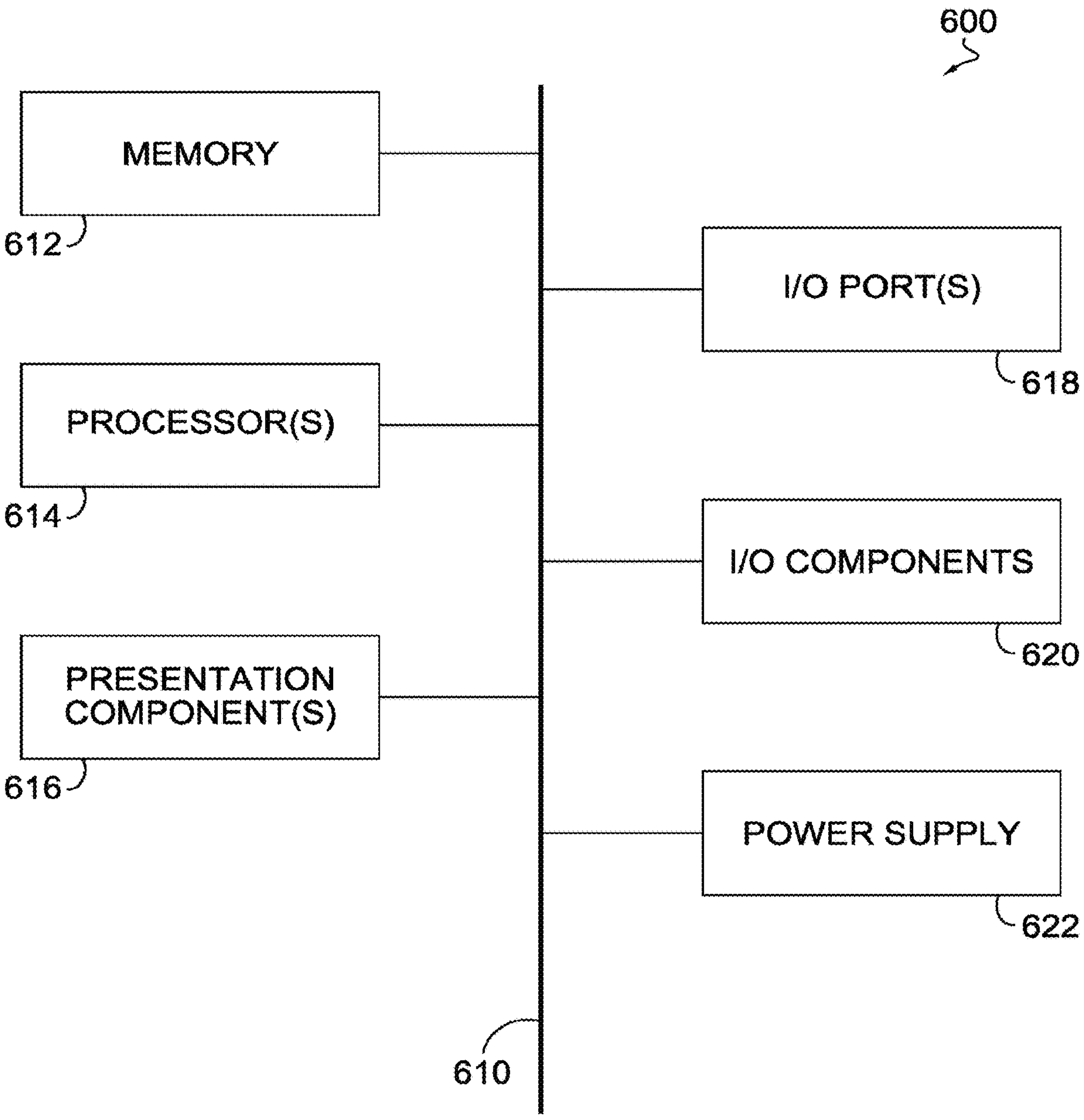
FIG. 16 illustrates an example computing device, in accordance with embodiments described herein.

With reference to FIG. 16, computing device 600 includes a bus 610 that directly or indirectly couples the following devices: memory 612, one or more processors 614, one or more presentation components 616, input/output ports 618, input/output components 620, and an illustrative power supply 622. In some aspects, some I/O ports may be linked to wired or wireless communications. The logic for when and which parcel 102 to deliver may be taken by the tote 130 or an external computing unit such as a handheld unit or an in-car computer managing several containers 100 simultaneously. Bus 610 represents what may be one or more busses (such as an address bus, data bus, or combination thereof). Although the various blocks of FIG. 16 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 16 is merely illustrative of an exemplary computing device that can be used in connection with one or more embodiments of the present invention. Distinction is not made between such categories as “workstation,” “server,” “laptop,” “hand-held device,” etc., as all are contemplated within the scope of FIG. 16 and reference to “computing device.”

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, random access memory (RAM), read-only memory (ROM), electrically erasable programmable read-only memory (EEPROM), flash memory or other memory technology, Compact Disc Read-Only Memory (CD-ROM), digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media excludes signals per se.

Communication media typically embodies computer-readable instructions, data structures, program modules or other data in a modulated data signal such as a carrier wave or other transport mechanism and includes any information delivery media. The term “modulated data signal” means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

Memory 612 includes computer storage media in the form of volatile and/or nonvolatile memory and may include memory 124. The memory may be removable, non-removable, or a combination thereof. Exemplary hardware devices include solid-state memory, hard drives, optical-disc drives, etc. Computing device 600 includes one or more processors that read data from various entities such as memory 612, memory 124 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms “step” and/or “block” may be used herein to connote different elements of methods employed, the terms should not be interpreted as implying any particular order among or between various steps herein disclosed unless and except when the order of individual steps is explicitly described.

Throughout this disclosure, words such as “a” and “an,” unless otherwise indicated to the contrary, include the plural as well as the singular. Thus, for example, the constraint of “a feature” is satisfied where one or more features are present. Also, the term “or” includes the conjunctive, the disjunctive, and both (a or b thus includes either a or b, as well as a and b).

It will be understood that certain features and sub-combinations are of utility and may be employed without reference to other features or sub-combinations. This is contemplated by and is within the scope of the claims. The described technology may be made without departing from the scope, it is to be understood that all matter described herein or illustrated in the accompanying drawings is to be interpreted as illustrative and not in a limiting sense.

The present invention has been described in relation to particular examples, which are intended in all respects to be illustrative rather than restrictive. From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

Some aspects of this disclosure have been described with respect to the examples provided in the figures. Additional aspects of the disclosure will now be described that may be related subject matter included in one or more claims or clauses of this application at the time of filing, or one or more related applications, but the claims or clauses are not limited to only the subject matter described in the below portions of this description. These additional aspects may include features illustrated by the figures, features not illustrated by the figures, and any combination thereof. When describing these additional aspects, reference may be made to elements depicted by the figures for illustrative purposes.

As used herein and in connection with the claims listed hereinafter, the terminology “any of clauses” or similar variations of said terminology is intended to be interpreted such that features of claims/clauses may be combined in any combination. For example, an exemplary clause 4 may indicate the method/apparatus of any of clauses 1 through 3, which is intended to be interpreted such that features of clause 1 and clause 4 may be combined, elements of clause 2 and clause 4 may be combined, elements of clause 3 and 4 may be combined, elements of clauses 1, 2, and 4 may be combined, elements of clauses 2, 3, and 4 may be combined, elements of clauses 1, 2, 3, and 4 may be combined, and/or other variations.

The following clauses are aspects contemplated herein.

Clause 1. A container may include: a frame having an open face; dividers extending from a first side of the frame to a second side of the frame, where the dividers are movable to create a plurality of compartments for items; a panel movably coupled to the frame and positioned to at least partially cover the open face; a movement mechanism coupled to the panel and operable to move the panel with respect to the frame; and a tote disposed within the frame, the tote having a first tote side with first lateral grooves therein and a second tote side with second lateral grooves therein, and each of the dividers is slidingly supported along at least one of the first lateral grooves and at least one of the second lateral grooves, where the panel covers the open face on the frame and the movement mechanism is configured to move the panel to expose an area of the open face corresponding to a selected compartment of the plurality of compartments containing an item of the items.

Clause 2. The container of clause 1, where the frame includes a track, and the panel is movably held within the track.

Clause 3. The container of any of clauses 1-2, where at least one divider of the dividers is stored at an end of the tote as available to create an additional compartment.

Clause 4. The container of any of clauses 1-3, further comprising a divider movement mechanism operable to move the at least one divider away from the end of the tote to create the additional compartment.

Clause 5. The container of any of clauses 1-4, wherein the divider movement mechanism comprises a drive belt and a releasable divider engagement device coupled to the drive belt, the releasable divider engagement device comprising a first surface to select the at least one divider and a catch surface to move the at least one divider to a position away from the end of the tote, creating the additional compartment.

Clause 6. The container of any of clauses 1-5, further comprising a position sensing system that determines a position of each of the dividers that is within the tote.

Clause 7. The container of any of clauses 1-6, further comprising memory storage to store the position of each of the dividers that is within the tote.

Clause 8. The container of any of clauses 1-7, wherein the movement mechanism is in communication with the memory storage, and the movement mechanism moves the panel to expose the area of the open face corresponding to the selected compartment as determined by the position of each divider of the dividers corresponding to the selected compartment stored in the memory storage.

Clause 9. The container of any of clauses 1-8, wherein the position sensing system comprises a belt tension sensing system that senses and records an increased belt tension when a divider of the dividers contacts an adjacent item of the items.

Clause 10. The container of any of clauses 1-6, further comprising a divider movement mechanism, wherein the position sensing system comprises a series of hall effect sensors arranged along a length of a drive belt of the divider movement mechanism, and each divider of the dividers has a magnet coupled thereto in alignment with the series of hall effect sensors that signals one of the series of hall effect sensors when the divider is moved into a position to create a compartment of the plurality of compartments.

Clause 11. A container comprising: a frame having an open face; dividers extending from a first side of the frame to a second side of the frame, where the dividers are movable to create a plurality of compartments for items; a panel movably coupled to the frame and positioned to at least partially cover the open face; and a motor coupled to the panel and operable to move the panel with respect to the frame, where the panel covers the open face, the motor moves the panel to expose an area of the open face corresponding to a selected compartment of the plurality of compartments containing an item of the items, and at least some of the dividers are stored adjacent to one another at an end of the frame as stored dividers that are available to create additional compartments.

Clause 12. The container of clause 11, wherein the frame includes a track, and the panel is movably held within the track.

Clause 13. The container of any of clauses 11-12, further comprising a first container side and a second container side spaced from the first container side, the first container side and the second container side having lateral grooves therein, and the dividers are slidingly supported along the lateral grooves.

Clause 14. The container of any of clauses 11-13, further comprising a divider movement mechanism, wherein the divider movement mechanism is operable to select a next available divider from the stored dividers and move the next available divider away from the end of the frame to create a next parcel compartment.

Clause 15. The container of any of clauses 11-14, wherein the divider movement mechanism comprises a drive belt and a releasable divider engagement device coupled to the drive belt, the releasable divider engagement device comprising a first surface to select the next available divider from the stored dividers and a catch surface to move the next available divider to a position away from the end of the frame, creating the next parcel compartment.

Clause 16. The container of any of clauses 11-15, further comprising a position sensing system that senses a position of each of the stored dividers, along the first side and the second side, moved by the divider movement mechanism.

Clause 17. The container of any of clauses 11-16, wherein the motor is in communication with memory storage storing the position of each of the stored dividers, and the motor moves the panel to expose the area of the open face corresponding to the selected compartment.

Clause 18. The container of any of clauses 11-17, wherein the position sensing system comprises a belt tension sensing system that senses and records an increased belt tension when a divider of the dividers contacts an adjacent item of the items.

Clause 19. The container of an of clauses 11-18, wherein the position sensing system comprises a series of hall effect sensors arranged along a length of a drive belt of the divider movement mechanism, and each divider of the dividers has a magnet coupled thereto in alignment with the series of hall effect sensors that signals one of the series of hall effect sensors when the divider is moved into a position to create a compartment of the plurality of compartments.

Clause 20. A container may include: a frame; dividers extending from a first side of the frame to a second side of the frame, where the dividers are movable to create a plurality of compartments for items; and a tote disposed within the frame, the tote having a first tote side with first lateral grooves therein and a second tote side with second lateral grooves therein, where each of the dividers is slidingly supported along at least one of the first lateral grooves and at least one of the second lateral grooves, and at least some of the dividers are stored adjacent to one another at an end of the frame as stored dividers that are available to create additional compartments.

The invention claimed is:

1. A container comprising:

a frame having an open face;

dividers extending from a first side of the frame to a second side of the frame, wherein the dividers are movable to create a plurality of compartments for items;

a panel movably coupled to the frame and positioned to at least partially cover the open face;

a motor coupled to the panel and operable to move the panel with respect to the frame; and a tote disposed within the frame, the tote having a first tote side with first lateral grooves therein and a second tote side with second lateral grooves therein, and each of the dividers is slidingly supported along at least one of the first lateral grooves and at least one of the second lateral grooves, wherein the panel covers the open face on the frame and the motor is configured to move the panel to expose an area of the open face corresponding to a selected compartment of the plurality of compartments containing an item of the items.

2. The container of claim 1, wherein the frame includes a track, and the panel is movably held within the track.

3. The container of claim 1, wherein at least one divider of the dividers is stored at an end of the tote as available to create an additional compartment.

4. The container of claim 3, further comprising a divider movement mechanism comprising a drive belt driven by at least one of a pulley or a gear and operable to move the at least one divider away from the end of the tote to create the additional compartment.

5. The container of claim 4, wherein the divider movement mechanism comprises a releasable divider engagement device coupled to the drive belt, the releasable divider engagement device comprising a first surface to select the at least one divider and a catch surface to move the at least one divider to a position away from the end of the tote, creating the additional compartment.

6. The container of claim 1, further comprising a position sensing system that determines a position of each of the dividers that is within the tote.

7. The container of claim 6, further comprising memory storage to store the position of each of the dividers that is within the tote.

8. The container of claim 7, wherein the motor is in communication with the memory storage, and the motor moves the panel to expose the area of the open face corresponding to the selected compartment as determined by the position of each divider of the dividers corresponding to the selected compartment stored in the memory storage.

9. The container of claim 6, wherein the position sensing system comprises a belt tension sensing system that senses and records an increased belt tension when a divider of the dividers contacts an adjacent item of the items.

10. The container of claim 6, further comprising a divider movement mechanism, wherein the position sensing system comprises a series of hall effect sensors arranged along a length of a drive belt of the divider movement mechanism, and each divider of the dividers has a magnet coupled thereto in alignment with the series of hall effect sensors that signals one of the series of hall effect sensors when the divider is moved into a position to create a compartment of the plurality of compartments.

11. A container comprising:

a frame having an open face;

dividers extending from a first side of the frame to a second side of the frame, wherein the dividers are movable to create a plurality of compartments for items;

a panel movably coupled to the frame and positioned to at least partially cover the open face;

a motor coupled to the panel and operable to move the panel with respect to the frame; and a divider movement mechanism comprising a drive belt driven by at least one of a pulley or a gear, wherein the panel covers the open face, the motor moves the panel to expose an area of the open face corresponding to a selected compartment of the plurality of compartments containing an item of the items, and at least some of the dividers are stored adjacent to one another at an end of the frame as stored dividers that are available to create additional compartments, and the divider movement mechanism is operable to select a next available divider from the stored dividers and move the next available divider away from the end of the frame to create a next parcel compartment.

12. The container of claim 11, wherein the frame includes a track, and the panel is movably held within the track.

13. The container of claim 11, further comprising a first container side and a second container side spaced from the first container side, the first container side and the second container side having lateral grooves therein, and the dividers are slidingly supported along the lateral grooves.

14. The container of claim 11, wherein the divider movement mechanism comprises a releasable divider engagement device coupled to the drive belt, the releasable divider engagement device comprising a first surface to select the next available divider from the stored dividers and a catch surface to move the next available divider to a position away from the end of the frame, creating the next parcel compartment.

15. The container of claim 11, further comprising a position sensing system that senses a position of each of the stored dividers, along the first side and the second side, moved by the divider movement mechanism.

16. The container of claim 15, wherein the motor is in communication with memory storage storing the position of each of the stored dividers, and the motor moves the panel to expose the area of the open face corresponding to the selected compartment.

17. The container of claim 15, wherein the position sensing system comprises a belt tension sensing system that senses and records an increased belt tension when a divider of the dividers contacts an adjacent item of the items.

18. The container of claim 15, wherein the position sensing system comprises a series of hall effect sensors arranged along a length of the drive belt of the divider movement mechanism, and each divider of the dividers has a magnet coupled thereto in alignment with the series of hall effect sensors that signals one of the series of hall effect sensors when the divider is moved into a position to create a compartment of the plurality of compartments.

* * * * *